April 24, 1951 M. L. LEPPERT 2,549,828
MODULATION SYSTEM
Filed Aug. 30, 1945
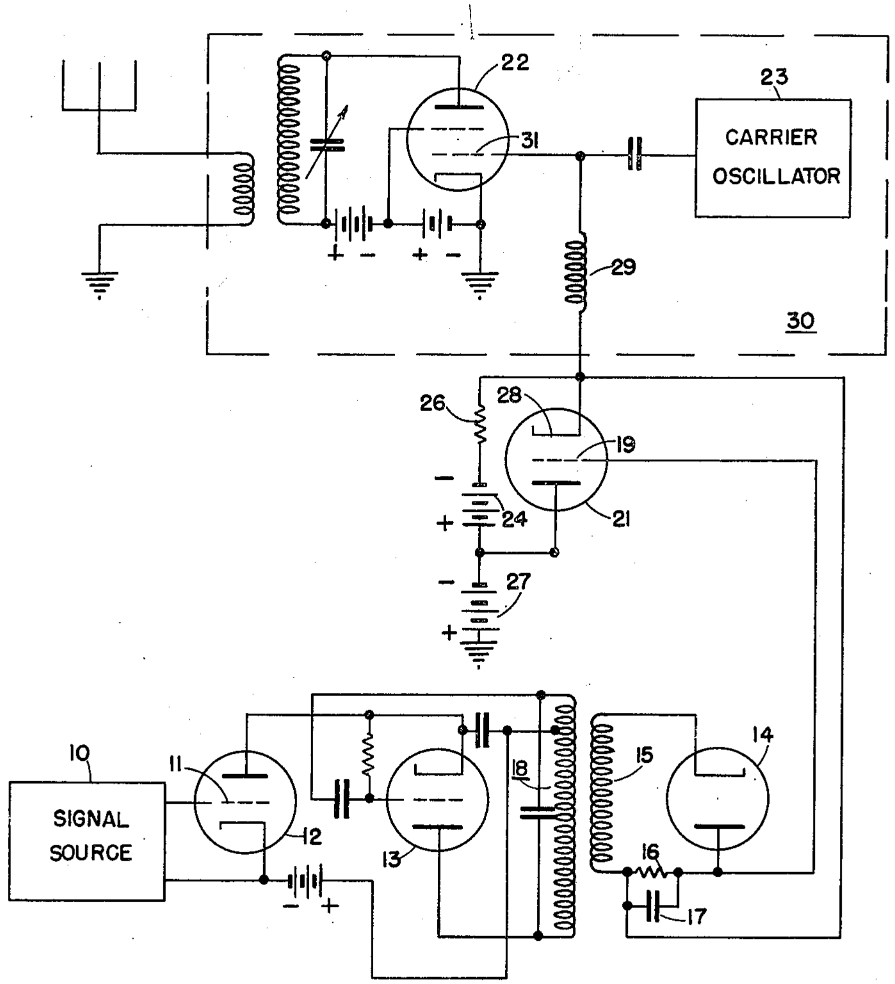
Inventor
MELVIN L. LEPPERT
By Ralph L. Chappell
Attorney Patented Apr. 24, 1951

2,549,828

UNITED STATES PATENT OFFICE 2,549,828

MODULATION SYSTEM

Melvin L. Leppert, Washington, D. C.

Application August 30, 1945, Serial No. 613,694

1 Claim. (Cl. 332—31)

(Granted under the act of March 3, 1883, as amended April 30, 1928; 370 O. G. 757)

This invention relates to means for modulation of a carrier wave.

An object of the invention is to provide novel means for modulating a carrier wave in accordance with all frequency components of a signal, including the direct current component.

Another object of the invention is to provide means for modulating a carrier wave in accordance with a signal containing a direct current component, including non-conductive means interposed between the signal source and the carrier wave source.

A further object of the invention is to provide novel means for high-speed keying of a radio transmitter.

The invention provides in combination a sub-carrier wave generator, rectifier means non-conductively coupled to the sub-carrier wave generator for deriving a uni-directional wave from the sub-carrier wave, a carrier wave generator, and means for modulating the carrier wave in accordance with the amplitude of the uni-directional wave. Means are provided for modulating the sub-carrier wave in accordance with the amplitude of a signal, so that the signal is impressed on the uni-directional wave, thereby modulating the carrier in accordance with all frequency components of the signal. Additionally, means are provided for attenuating the sub-carrier wave components of the uni-directional wave. The uni-directional wave preferably is applied to a control element of a cathode loaded amplifier tube. The cathode of the amplifier tube is then directly connected to a control element of the carrier wave generator.

A better understanding of the invention may be had by reference to the following description and to the accompanying drawing which shows a schematic diagram of an exemplary embodiment of the invention.

Referring now to the drawing, a signal is applied from a signal source 10 to the grid 11 of tube 12 which is conductively connected in series with the plate current circuit of oscillator tube 13. The static plate resistance of tube 12 varies in accordance with the instantaneous magnitude of the signal. Thus, tube 12 operates as a variable resistance, controlled by the signal, which varies the plate voltage of tube 12, thereby modulating the amplitude of the oscillations generated by tube 13 in tank circuit 18. These oscillations constitute a sub-carrier wave which is amplitude modulated by the signal. The sub-carrier wave is non-conductively coupled by means of mutual inductance between tank circuit 18 and coil 15 to rectifier means which may comprise a diode 14 and a load impedance such as resistor 16. It is contemplated that the frequency of the sub-carrier wave may be much higher than the maximum signal frequency so that the sub-carrier wave may be attenuated conveniently by a low pass filter in the load circuit of the rectifier 14. In its simplest form, the low pass filter may comprise a by-pass condenser 17 connected across the load resistor 16. The rectifier 14 thus functions to derive a uni-directional wave from the sub-carrier wave. Since the sub-carrier wave is amplitude modulated by the signal as previously described, the envelope of the uni-directional wave has substantially the same waveform as the signal. Furthermore, due to the action of the rectifier, the direct current component of the uni-directional wave is substantially proportional to the direct current component, if any, of the signal.

The uni-directional wave is applied with negative polarity to the control grid 19 of amplifier tube 21. The space current path of amplifier tube 21 constitutes a portion of the grid return circuit of carrier amplifier tube 22 which may be driven by a carrier oscillator 23. Plate voltage is applied to amplifier tube 21 from a voltage source 24 through a load resistor 26. The plate of tube 21 is maintained at a fixed potential provided by a voltage source 27 and the cathode potential of tube 21 varies in accordance with the uni-directional wave applied to the grid 19. The cathode 28 of tube 21 is conductively connected through a choke 29, which has a high impedance at the frequency of the carrier wave, to the control grid 31 of carrier amplifier tube 22. Consequently, the potential of control grid 31 varies in accordance with the signal, causing the carrier wave output of amplifier tube 22 to be amplitude modulated by the signal.

An important feature of the invention is the non-conductive coupling provided between the oscillator tube 13 and the diode 14, which isolates the signal source 10 from the cathode 28 of tube 21. Since the cathode 28 of tube 21 is at a relatively high negative potential with respect to ground, this feature of the invention enables modulation by an external signal source 10 which is necessarily at or near ground potential and at the same time enables modulation of the carrier wave generator by the zero-frequency component of the signal. As is shown in the drawing, inductive coupling between the oscillator tank circuit 18 and rectifier 14 may be used to carry out the above-mentioned feature. It will be apparent, however, that capacitive coupling may be used to accomplish the same result.

Consequently, the invention is particularly well adapted for attachment to an existing radio transmitter which is represented by the combination 30 of a carrier oscillator 23 and a carrier amplifier 22. The invention provides means for accomplishing various forms of amplitude modulation of such transmitters. The signal provided by source 10 may, for example, be an audio, video, or keying signal.

It will be understood that the embodiment of the invention herein described is exemplary only and that the scope of the invention is to be determined by the appended claim.

The invention described herein may be manufactured and used by or for the Government of the United States of America for governmental purposes without the payment of any royalties thereon or therefor.

What is claimed is:

In combination, a sub-carrier wave generator, a modulator connected to said generator for modulating the sub-carrier wave amplitude, rectifier means inductively coupled to said generator for deriving a unidirectional wave therefrom, a main carrier wave generator including a vacuum tube amplifier for receiving and amplifying said main carrier wave, said vacuum tube amplifier including a grid element for receiving said main carrier wave and for controlling the amplitude of the output wave therefrom, a bias control circuit for said grid including a source of bias voltage and a second grid controlled vacuum tube the main space current carrying path for which is connected in series relation with the bias voltage in the grid return path of said first named vacuum tube amplifier, and a direct conductive connection between the output of said rectifier and the grid circuit of said second tube.

MELVIN L. LEPPERT.

REFERENCES CITED

The following references are of record in the file of this patent:

UNITED STATES PATENTS

| Number | Name | Date |
|---|---|---|
| 2,013,807 | Price | Sept. 10, 1935 |
| 2,118,172 | Ditcham | May 24, 1938 |
| 2,206,130 | Schunack | July 2, 1940 |
| 2,346,020 | Gillespie | Apr. 4, 1944 |

FOREIGN PATENTS

| Number | Country | Date |
|---|---|---|
| 430,210 | Great Britain | June 14, 1935 |